No. 785,675. Patented March 21, 1905.

UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN- & ANILINFAR- BEN- FABRIK, OF OFFENBACH-ON-THE-MAIN, GERMANY.

ORANGE SULFUR DYE AND PROCESS OF MAKING SAME.

SPECIFICATION forming part of Letters Patent No. 785,675, dated March 21, 1905.

Application filed December 1, 1904. Serial No. 235,003. (Specimens.)

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hessen, Germany, have invented certain new and useful Improvements in Orange Sulfur Dyes, of which the following is a specification.

This invention has reference to the manufacture of sulfur dyes, and is based upon the discovery that the azo dyes resulting from the combination of the diazo compounds of easily-volatile aromatic amins with mono-acetyltoluylendiamin ($CH_3:NH_2:NH.COCH_3$—1:2:4; cf. Beilstein, *Handbuch der Organischen Chemie*, Tome IV, page 602) are very suitable for the production of valuable orange sulfur dyes.

The process consists in heating to higher temperatures these azo dyes together with sulfur advantageously in the presence of bases of the diphenyl series and subsequently treating with caustic alkalies or alkali sulfids in order to render the products more easily soluble. The coloring-matters thus obtained yield bright clear shades, remaining nearly unaltered by subsequently treating them with chromium agents and being distinguished by great fastness to washing.

The following example may illustrate the nature of this invention, parts being by weight and degrees referring to the centigrade scale. The azo dye may be made as follows: Dissolve 16.4 parts of mono-acetyltoluylendiamin in 11.4 parts of hydrochloric acid of 20° Baumé and two hundred parts of water and add forty-two parts of crystallized sodium acetate. After cooling down to zero pour in a diazobenzolchlorid solution made from 9.3 parts of anilin, thirty-four parts of hydrochloric acid of 20° Baumé, 6.9 parts of sodium nitrite, and the necessary quantity of water. The resulting dyestuff precipitates in yellow flocks. As soon as test portions drawn from time to time proof no more diazo compound filter, press, and dry. Anilin may be replaced by its homologues. Now for preparing the sulfur dye proceed as follows: Melt a mixture of twenty parts of the azo dye, obtained as above, twenty parts of benzidin, and one hundred parts of sulfur. On heating up to 220° a violent reaction takes place. Maintain the temperature at 220° to 240° during about ten hours, until no more sulfureted hydrogen escapes. Allow the crude melt to cool and after powdering put it into a solution of one hundred parts of caustic soda and one hundred and thirty-five parts of water. Then heat during an hour up to 110° to 120°, dilute with about five hundred parts of water, and precipitate the coloring-matter by means of hydrochloric acid. It forms a reddish-brown powder insoluble in alcohol and diluted alkali carbonates, slightly soluble in concentrated sulfuric acid and in diluted caustic alkalies, soluble in alkali sulfids with a yellowish-brown shade. It yields on cotton, when dyeing from a bath containing sodium sulfid, orange-yellow shades of a very good fastness. Another manner for dissolving the crude melt is to put it at 100° centigrade into three hundred parts of molten sodium sulfid (crystallized) and to dry subsequently at this temperature. On changing the proportions of the components—for instance, diminishing the sulfur to forty parts—the resulting dyestuffs will still show the same properties.

Now what I claim, and desire to secure by Letters Patent, is the following:

1. The process of making orange sulfur dyes, consisting in heating the azo dyestuffs, resulting from the combination of the diazo compounds from easily-volatile aromatic amins and mono-acetyltoluylendiamin $$(CH_3:NH_2:NH.COCH_3—1:2:4)$$

together with sulfur at an elevated temperature in the presence of bases of the diphenyl series and subsequently treating with alkali compounds, substantially as described.

2. The process of making orange sulfur dyes, consisting in heating the azo dyestuffs, resulting from the combination of the diazo compounds from easily-volatile aromatic amins and mono-acetyltoluylendiamin

together with sulfur at an elevated temperature in the presence of benzidin and subsequently treating with caustic alkalies, substantially as described.

3. As a new article of manufacture, the sulfur dye, which is formed by heating together with sulfur at an elevated temperature in the presence of benzidin the azo dyes resulting from the combination of the diazo compounds from easily-volatile aromatic amins and mono-acetyltoluylendiamin

and subsequently treating with caustic alkalies, forming a reddish-brown powder, being insoluble in alcohol and diluted alkali carbonates, slightly soluble in concentrated sulfuric acid and diluted caustic alkalies, soluble in alkali sulfids with a yellowish-brown color, and dyeing on cotton from a bath containing sodium sulfid orange-yellow shades, all substantially as hereinbefore described.

In testimony that I claim the foregoing as my invention I have signed my name, in presence of two witnesses, this 18th day of November, 1904.

AUGUST LEOPOLD LASKA.

Witnesses:
HERMANN WEIL,
OSCAR STANDHARDT.